(12) United States Patent
Kresnyak et al.

(10) Patent No.: US 10,982,151 B2
(45) Date of Patent: Apr. 20, 2021

(54) PROCESS FOR CONVERTING CARBONACEOUS MATERIAL INTO LOW TAR SYNTHESIS GAS

(71) Applicants: EXPANDER ENERGY INC., Calgary (CA); AIR TECHNIC S.R.O., Prague (CZ)

(72) Inventors: Steve Kresnyak, Calgary (CA); Pavel Zahorik, Prague (CZ)

(73) Assignee: EXPANDER ENERGY INC., Calgary (CA)

( * ) Notice: Subject to any disclaimer, the term of this patent is extended or adjusted under 35 U.S.C. 154(b) by 339 days.

(21) Appl. No.: 15/740,072

(22) PCT Filed: Sep. 29, 2017

(86) PCT No.: PCT/CA2017/051161
§ 371 (c)(1),
(2) Date: Dec. 27, 2017

(87) PCT Pub. No.: WO2018/058252
PCT Pub. Date: Apr. 5, 2018

(65) Prior Publication Data
US 2020/0032150 A1    Jan. 30, 2020

Related U.S. Application Data

(63) Continuation-in-part of application No. 15/419,722, filed on Jan. 30, 2017, now abandoned.
(Continued)

(51) Int. Cl.
*C10B 1/04* (2006.01)
*C10B 3/00* (2006.01)
(Continued)

(52) U.S. Cl.
CPC .................. *C10B 1/04* (2013.01); *C10B 3/00* (2013.01); *C10B 33/08* (2013.01); *C10B 49/04* (2013.01);
(Continued)

(58) Field of Classification Search
CPC .. C10B 1/04; C10B 3/00; C10B 49/02; C10B 49/04; C10B 33/08; C10B 53/02;
(Continued)

(56) References Cited

U.S. PATENT DOCUMENTS 4,306,506 A * 12/1981 Rotter ........................ C10J 3/26
110/229
4,309,195 A * 1/1982 Rotter ........................ C10J 3/26
48/111
(Continued)

FOREIGN PATENT DOCUMENTS

CA       2784448       7/2011
CL      200701288      5/2007
(Continued)

OTHER PUBLICATIONS

International Search Report and Written Opinion, Canadian Intellectual Property Office, Application No. PCT/CA2017/051161, dated Jan. 26, 2018.
(Continued)

*Primary Examiner* — Jonathan Miller
*Assistant Examiner* — Gabriel E Gitman
(74) *Attorney, Agent, or Firm* — Gottlieb, Rackman & Reisman, P.C.

(57) ABSTRACT

A continuous multi-stage vertically sequenced gasification process for conversion of solid carbonaceous fuel material into clean (low tar) syngas. The process involves forming a pyrolysis residue bed having a uniform depth and width to pass raw syngas there through for an endothermic reaction,
(Continued)

while controlling the reduction zone pressure drop, resident time and syngas flow space velocity during the endothermic reaction to form substantially tar free syngas, to reduce carbon content in the pyrolysis residue, and to reduce the temperature of raw syngas as compared to the temperature of the partial oxidation zone.

26 Claims, 4 Drawing Sheets

Related U.S. Application Data

(60) Provisional application No. 62/401,711, filed on Sep. 29, 2016.

(51) Int. Cl.
| | | |
|---|---|---|
| *C10B 49/04* | (2006.01) | |
| *C10B 53/02* | (2006.01) | |
| *C10B 33/08* | (2006.01) | |
| *C10J 3/26* | (2006.01) | |
| *C10B 49/02* | (2006.01) | |
| *C10J 3/72* | (2006.01) | |
| *C10J 3/36* | (2006.01) | |
| *C10J 3/84* | (2006.01) | |
| *C10J 3/66* | (2006.01) | |
| *C10K 3/02* | (2006.01) | |
| *C10B 57/16* | (2006.01) | |
| *C10B 57/06* | (2006.01) | |

(52) U.S. Cl.
CPC .............. *C10B 53/02* (2013.01); *C10B 57/06* (2013.01); *C10B 57/16* (2013.01); *C10J 3/26* (2013.01); *C10J 3/36* (2013.01); *C10J 3/66* (2013.01); *C10J 3/721* (2013.01); *C10J 3/84* (2013.01); *C10K 3/026* (2013.01); *C10B 49/02* (2013.01); *C10J 2300/092* (2013.01); *C10J 2300/0923* (2013.01); *C10J 2300/0943* (2013.01); *C10J 2300/0946* (2013.01); *C10J 2300/0956* (2013.01); *C10J 2300/0959* (2013.01); *C10J 2300/0969* (2013.01); *C10J 2300/1846* (2013.01)

(58) Field of Classification Search
CPC .. C10B 57/06; C10B 57/16; C10J 3/26; C10J 3/36; C10J 3/66; C10J 3/721; C10J 3/84; C10J 2300/092; C10J 2300/0923; C10J 2300/0943; C10J 2300/0946; C10J 2300/0956; C10J 2300/0959; C10J 2300/0969; C10J 2300/1846; C10J 3/38; C10J 3/42; C10J 3/74; C10J 2300/0909; C10J 2300/0916; C10J 2300/0976; C10J 2300/1246; C10J 2300/1609; C10K 3/026; C10K 3/005; C10K 3/006; C10G 2/32; Y02E 50/10; Y02E 50/30; Y02P 20/145

See application file for complete search history.

(56) References Cited

U.S. PATENT DOCUMENTS

| | | | |
|---|---|---|---|
| 2011/0308155 A1 | 12/2011 | Paskach et al. | |
| 2015/0240172 A1* | 8/2015 | Schwarz | .................. C10J 3/723 48/86 R |

FOREIGN PATENT DOCUMENTS

| | | | | |
|---|---|---|---|---|
| CL | 200901687 | 8/2009 | | |
| CZ | 295171 | 4/2005 | | |
| CZ | 28354 | 7/2015 | | |
| CZ | 28354 U1 * | 7/2015 | ............... | C10J 3/02 |
| FR | 2569715 | 3/1986 | | |
| GB | 741225 A * | 11/1955 | ............ | B01J 8/1863 |
| WO | 2015/090251 | 6/2015 | | |
| WO | 2016/075362 | 5/2016 | | |

OTHER PUBLICATIONS

Chilean Office Action for Corresponding CL Application No. 201900833 dated Sep. 3, 2020.

Supplementary European Search Report for Corresponding Application EP 17 85 4301 dated Apr. 28, 2020.

\* cited by examiner

D ......... SEPARATION DEPTH
$d$ ......... CHAR BED DEPTH
$h$ ......... CHAR BED WIDTH
$\emptyset$ ........ CHAR BED ANGLE

PROCESS FOR CONVERTING CARBONACEOUS MATERIAL INTO LOW TAR SYNTHESIS GAS

FIELD OF THE INVENTION

The present invention pertains to the field of gasification of carbonaceous feedstock/fuel, and in particular to a process and system for conversion of carbonaceous fuel materials into clean high quality syngas substantially devoid of tars and for the production of clean ash substantially devoid of carbon content.

BACKGROUND

Gasification can convert carbon-containing materials to useful chemical products. These chemical products typically involve synthesis gas (syngas), which can be further combusted to produce electricity, or chemically reacted to produce oxygenates or hydrocarbons in catalytic systems.

Several types of gasification and pyrolysis methods and apparatuses have been developed to achieve efficient conversion of biomass into clean gaseous products. Many of the gasification processes known in the art have failed due to insufficient attention to low tar production, efficient tar destructions, and full decarbonization of char and ash.

Existing downdraft gasifiers require very high quality wood fuels or biomass, such as ash free wood blocks or high quality wood chips, and cannot be scaled up to economically attractive scales without severely increased tar production. Multi-stage downdraft gasifiers which comprise separate zones for fuel pyrolysis, partial oxidation, and reduction of bed gas, have also been developed, however such gasifiers known in the art also result in substantial amount of tar production, significant tar levels retained in the syngas, and the ash containing very high levels of unconverted carbon content.

CZ Patent No. 295171 discloses a three zone biomass gasifier comprising vertically oriented mutually nested cylindrical containers defining drying chamber, distillation chamber and a combined reduction & combustion chamber, respectively. The gasifier is configured such that the gaseous mixture being generated in the chamber drying and distillation chambers can be exhausted, and introduced through a bypass into the combined reduction/combustion chamber for additional burn, and reduction to desired components of the gas. This gasifier is structurally complicated, and is known for its poor controllability and flexibility of performance.

PCT Publication No. WO 2015/090251 discloses a device for the multi-stage gasification of carbonaceous fuels, which comprises a hermetically sealed vertical container which is fitted with insulation. Inside vertical container is pyrolysis chamber which is adapted for filling with carbonaceous fuel from above of the container. Under pyrolysis chamber is provided a partial oxidation chamber for oxidation of the pyrolysis product which is delimited by a refractory casing and the partial oxidation chamber is followed by a reduction zone for chemical reduction of oxidized product gas.

The devices/systems as disclosed in CZ 295,171 and WO 2015/090251, result in considerable amount of tar in the product gases, which in turn clogs the cleaning devices used to clean the product gases. Further these systems have no means to effectively manage the reduction reaction and failed to produce consistent flow and quality of syngas.

For example, in the system described in WO 2015/090251, the residues obtained after pyrolysis and/or oxidation steps flow down, and collects at the bottom of the gasifier to form a reduction bed. As it well known in the art that pyrolysis/oxidation make an uneven/non-uniform bed due to the angle of repose of the falling material. The height difference between the center portion and the peripheral portion of such beds is so large that the pressure loss of gases passing through the bed have negative impact and an effective endothermic reaction cannot be achieved to increase the caloric value of produced gas.

CZ 28354 discloses a downdraft gasifier, comprising vertically stacked pyrolysis chamber, oxidation chamber and reduction chamber, wherein an attempt was made to improve the quality for produced syngas by providing a homogenizer on the floor of the reduction chamber. However, this arrangement also fails to provide a char bed of uniform depth and promotes channeling of the syngas, and leads to undesirable results.

WO 2016/075362 discloses a method and apparatus for gasifying raw material in an attempt to form low tar gaseous products, wherein the raw material is pyrolyzed in the presence of pyrolysis air to form a pyrolysis product, the pyrolysis product is then moved to a lower part of the gasifier, wherein a primary air is introduced countercurrently to the lower part, followed by carrying out a final gasification in a lower part of the gasifier in order to form a gasified gas. The gasified gas is then introduced into a catalytic oxidation part and through a catalyst layer of the catalytic oxidation part, and reforming the gasified gas by means of the catalytic oxidation in the presence of reforming air in the catalytic oxidation part, in order to form a gaseous product. This reference does not mention any means to effectively manage the reduction reactions, and would fail to produce consistent flow and quality of produced gas.

Therefore, a need exists for a process and system for gasification of carbonaceous material to form consistent clean product gases, such as syngas, while substantially reducing tar contents.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a process for converting carbonaceous fuel material into low tar syngas.

In accordance with an aspect of the present invention, there is provided a continuous multi-stage vertically sequenced gasification process for conversion of solid carbonaceous fuel material into clean (low tar) syngas in a gasifier comprising:
  i) a pyrolysis zone,
  ii) a partial oxidation zone located vertically downstream of the pyrolysis zone, and separated from the pyrolysis zone via a separation member comprising a plurality of upwardly angled vents;
  iii) a reduction zone located vertically downstream of the partial oxidation zone and comprising a sloped perforated floor, one or more openings located centrally relative to the perforated floor, and a centrally located deflector; the floor being sloped downward and inward toward the one or more openings, wherein the perforated floor is configured, by sizing of perforations therein, to primarily allow passage of syngas therethrough, and to inhibit passage of the pyrolysis residue obtainable in the pyrolysis zone;

the process comprises the steps of:

a) feeding the carbonaceous fuel material through the upper portion of the pyrolysis zone vertically downward towards the lower portion of the pyrolysis zone, while pyrolyzing the fuel into pyrolysis vapours comprising hydrocarbon material, and raw pyrolysis residue comprising char and ash;

b) optionally adding a first oxidant to the lower portion of the pyrolysis zone to achieve a temperature greater than 200° C.;

c) directing the pyrolysis vapours to the partial oxidation (PDX) zone, and directing the pyrolysis residue downwardly to the reduction zone via the separation member;

d) adding a second oxidant in the partial oxidation zone to achieve a temperature sufficient to reform the pyrolysis vapours into raw syngas containing significantly reduced levels of tar;

e) forming a pyrolysis residue bed having a uniform depth from the raw pyrolysis residue formed in step c) on the floor of the reduction zone;

f) passing the raw syngas from step d) downward through the raw pyrolysis residue bed formed in step e), and carrying out an endothermic reaction between $CO_2$ and/or $H_2O$ in the raw syngas and carbon of the char in the pyrolysis residue bed, while controlling the reduction zone pressure drop, resident time and flow space velocity of the raw syngas during the endothermic reaction to form substantially tar free enhanced syngas and a decarbonized pyrolysis residue;

g) passing the substantially tar free enhanced syngas from step f), in upward counter-current flow, to heat the pyrolysis zone and subsequently cool the substantially tar free enhanced syngas;

h) collecting the enhanced syngas; and i) collecting the decarbonized pyrolysis residue from the bottom of gasifier.

In accordance with an aspect of the present invention, there is provided a system for a continuous multi-stage vertically sequenced gasification process for conversion of solid carbonaceous fuel material into clean (low tar) syngas, the system comprises:

i) a pyrolysis zone for converting the fuel into pyrolysis vapours comprising hydrocarbon material, and carbon rich raw pyrolysis residue comprising char and ash;

ii) a partial oxidation zone located vertically downstream of the pyrolysis zone for conversion of the hydrocarbon material in the pyrolysis vapours into raw syngas comprising $H_2$, CO and $CO_2$;

iii) an endothermic reduction zone located vertically downstream of the partial oxidation zone for converting the raw syngas into enhanced syngas and for reducing carbon content of the raw pyrolysis residue to obtain decarbonized pyrolysis residue;

iv) a separation member located between the pyrolysis zone and the partial oxidation zone,
   the separation member comprising a plurality of upwardly angled vents to allow the pyrolysis vapours into the partial oxidation zone and to inhibit passage of the raw pyrolysis residue therethrough, and the separation member being configured to direct the pyrolysis residue into the reduction zone;

v) an outlet port for the decarbonized pyrolysis residue, located downstream of the reduction zone;

vi) an outlet for the enhanced syngas located downstream of the reduction zone;

vii) the reduction zone comprising a sloped perforated floor, one or more openings located centrally relative to the perforated floor, and a centrally located deflector, the floor being sloped downward and inward toward the one or more openings, and configured by sizing of perforations therein, to allow primarily passage of the raw syngas therethrough towards the outlet for the enhanced syngas and to inhibit passage of the raw pyrolysis residue, and the one or more openings being in fluidic communication with the outlet port, and configured to allow passage of the decarbonized pyrolysis residue therethrough.

DETAILED DESCRIPTION OF THE INVENTION

Definitions

Figure 1:
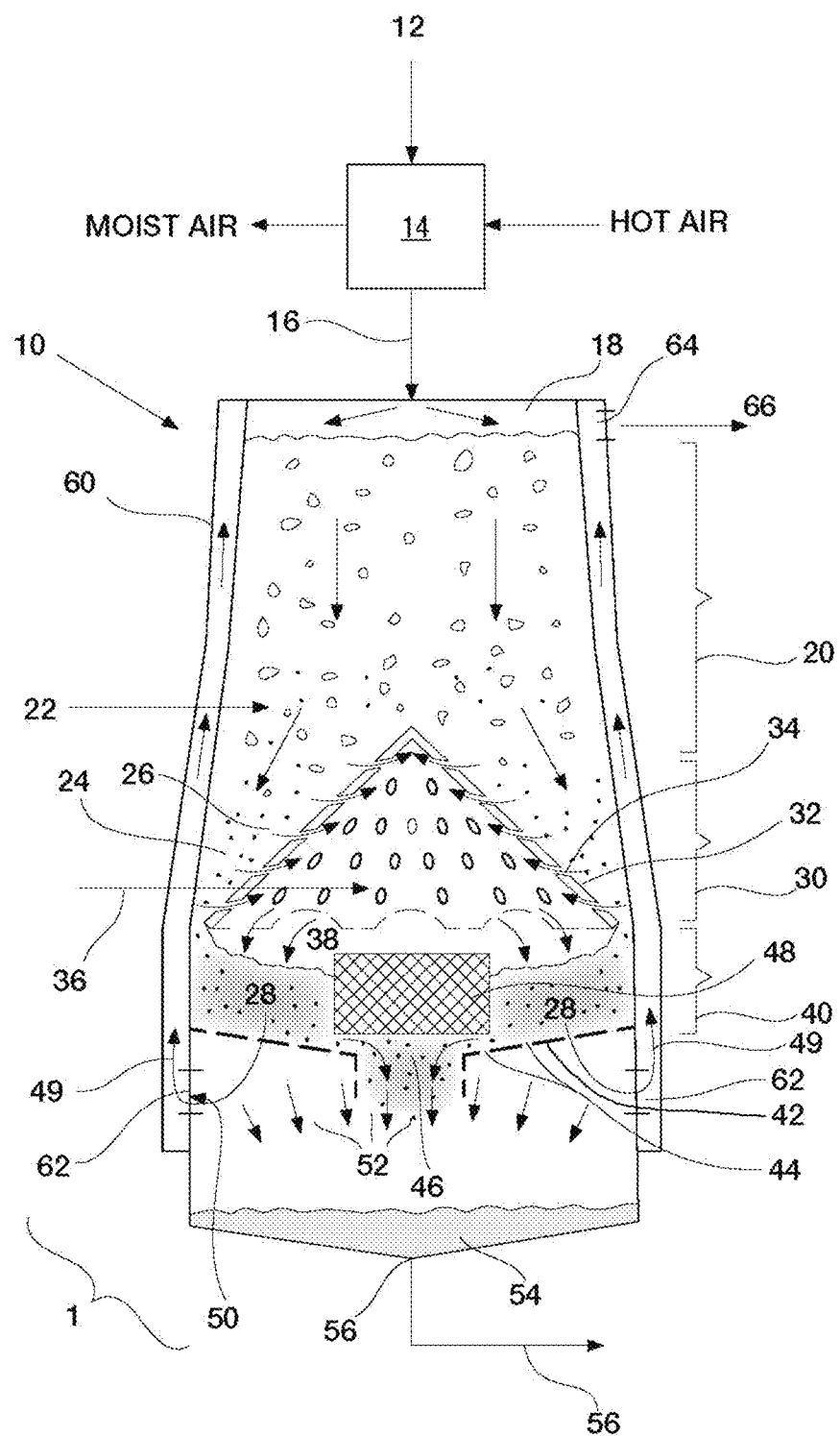
FIG. 1 is a schematic drawing depicting the system in accordance with an embodiment of the present invention.

As used herein, the term "about" refers to a +/−10% variation from the nominal value. It is to be understood that such a variation is always included in a given value provided herein, whether or not it is specifically referred to.

The term "hydrocarbon material" used herein includes hydrocarbons such as methane, and other hydrocarbon containing material obtained by pyrolysis of a fuel, which is commonly referred to as tars, or organic tars, or bio tars.

The term "char" used herein includes a solid material that remains after light gases and tar have been driven out, or released from a carbonaceous material during the initial stage of biomass decomposition, which is known as carbonization, charring, devolatilization or pyrolysis.

Unless defined otherwise, all technical and scientific terms used herein have the same meaning as commonly understood by one of ordinary skill in the art to which this invention belongs.

In one aspect of the present invention, there is provided a continuous multi-stage vertically sequenced gasification process for conversion of solid carbonaceous fuel material into clean (low tar) syngas in a gasifier comprising a pyrolysis zone, a partial oxidation zone located vertically downstream of the pyrolysis zone, and a reduction zone located vertically downstream of the partial oxidation zone and comprising a sloped perforated floor/base, one or more openings located radially inwardly of the perforated floor, and a centrally located deflector. The floor is sloped downward and inward toward the one or more openings, wherein the perforated floor is configured, by sizing of perforations therein, to primarily allow passage of syngas therethrough, and to inhibit passage of the pyrolysis residue obtainable in the pyrolysis zone.

The process of the present invention is carried out by feeding the carbonaceous fuel material through the upper portion of the pyrolysis zone vertically downward towards the lower portion of the pyrolysis zone, while pyrolyzing the fuel into pyrolysis vapours comprising hydrocarbons such as methane and tar, and raw pyrolysis residue comprising char, ash and carbon. A first oxidant is optionally added to the lower portion of the pyrolysis zone to achieve a temperature greater than 200° C.

The pyrolysis vapours are directed to the partial oxidation (PDX) zone, and the pyrolysis raw residue formed in the pyrolysis zone is directed downwardly to the reduction zone via a separation member positioned between the pyrolysis zone and the partial oxidation zone. The separation member comprises a plurality of upwardly angled vents to allow the pyrolysis vapours only into the partial oxidation zone. A second oxidant is then added in the partial oxidation zone to achieve a temperature greater than 900° C. to reform the pyrolysis vapours into raw syngas containing significantly reduced levels of tar.

A bed of pyrolysis residue having a uniform depth is formed on the floor/base of the reduction zone, and the raw syngas primarily formed in the partial oxidation zone and optionally in the pyrolysis zone is passed downward through the pyrolysis residue bed to carry out an endothermic reaction between $CO_2$ and $H_2O$ in the syngas and carbon of the char in the pyrolysis residue bed, while controlling the reduction zone pressure drop, resident time and syngas flow space velocity during the endothermic reaction to form substantially tar free raw syngas, to reduce carbon content in the pyrolysis residue, thereby forming a decarbonized pyrolysis residue. This step can also reduce the temperature of raw syngas as compared to the temperature of the partial oxidation zone. The substantially tar free enhanced syngas is then moved in upward counter-current flow in indirect thermal contact with the pyrolysis zone, to heat the pyrolysis zone and subsequently cool the substantially tar free syngas before collecting same.

In some embodiments of the present invention, the process is carried out under pressure, preferably up to full vacuum, partial vacuum and less than 600 psig, more preferably between partial and 100 psig.

In some embodiments, the first and second oxidants independently comprise air, enriched air, oxygen with purity greater than 85 wt %, oxygen with purity greater than 95 wt %, or a combination thereof. In some embodiments, the first oxidant and/or the second oxidant further comprises $H_2O$ (steam) and/or $CO_2$.

In some embodiments, the first oxidant and the second are same. In some embodiments, the first oxidant and the second are of different compositions.

In some embodiments, the first oxidant comprises air, enriched air, oxygen with purity greater than 85 wt %, oxygen with purity greater than 95 wt %, or a combination thereof, and the second oxidant comprises at least one of air, enriched air, oxygen with purity greater than 85 wt %, oxygen with purity greater than 95 wt %, premixed with $H_2O$ and/or $CO_2$.

In some embodiments of the process of the present invention, the syngas composition formed has a $H_2$:CO ratio from about 0.5:1 to about 1.5:1, preferably about 0.8:1 to about 1:1.

In some embodiments of the process of the present invention, the carbonaceous fuel material comprises biomass fuel selected from wood chips, railway tie chips, waste wood, forestry waste, sewage sludge, pet coke, coal, Municipal Solid Waste (MSW), Refuse-derived Fuel (RDF), or any combination.

In some embodiments of the process of the present invention, the biomass fuel is formed by a chipping, shredding, extrusion, mechanical processing, compacting, pelletizing, granulating, or crushing process. In some embodiments, the biofuel sprayed with, coated with or impregnated with liquid or solid carbonaceous materials is used.

In some embodiments of the process of the present invention, the PDX stage temperature is greater than 1250° C., or greater than the ash fusion temperature to create liquid slag.

In some embodiments of the present invention, the process further comprises adding an additional slag separation chamber to remove and quench the liquid slag to form a non-leachable by-product for safe disposal.

In some embodiments of the present invention, the process further comprises processing and cooling the tar free syngas to be used for electric power generation and chemical production, such as methanol, DME gasoline, and Fischer Tropsch liquids, such as syndiesel, synthetic jet fuel and synthetic wax.

The process of the present invention can be performed entirely in one chamber, or in separate chambers or a combination of chambers in a vertical configuration.

In another aspect of the present invention, there is provided an system for a continuous multi-stage vertically sequenced gasification process for conversion of solid carbonaceous fuel material into clean (low tar) syngas. The system of the present invention comprises a pyrolysis zone for converting the fuel into pyrolysis vapours comprising hydrocarbons and carbon rich raw pyrolysis residue comprising char and ash, a partial oxidation zone located vertically downstream of the pyrolysis zone for conversion of the hydrocarbons in the pyrolysis vapours into raw syngas comprising $H_2$, CO and $CO_2$, and an endothermic reduction zone located vertically downstream of the partial oxidation zone for converting the raw syngas into enhanced syngas and for reducing carbon content of the raw pyrolysis residue to obtain decarbonized pyrolysis residue.

In some embodiments of the system of the present invention, the pyrolysis zone, the partial oxidation zone and the reduction zone are contained within one container/chamber. In some embodiments, the pyrolysis zone, the partial oxidation zone and the reduction zone are contained in separate chambers arranged in a vertical configuration.

In some embodiments, the lower portion of the pyrolysis zone has a perimeter greater than that of the upper portion. In some embodiments, the pyrolysis zone has a gradually increasing perimeter towards the lower portion.

In some embodiments of the invention, any or all portions walls of chamber defining the pyrosylsis zone slope slightly and/or gradually outward from the top of the biomass fill level to the lowest point where reduced amount of char is present, where the bottom of the chamber is larger in area/perimeter than the top of the chamber. This allows the biomass material to advance without holdup and bridging, which further provides for continuous stable flow of advancing biofuel and produced syngas.

A separation member is positioned between the pyrolysis zone and the partial oxidation zone. The separation member comprises a plurality of upwardly angled vents or openings to allow the pyrolysis vapours into the partial oxidation zone and to inhibit passage of the raw pyrolysis residue therethrough. The separation member is also configured to direct the raw pyrolysis residue into the reduction zone. The system further comprises an outlet port for the decarbonized pyrolysis residue, positioned downstream of the reduction zone, and an outlet for the enhanced syngas positioned after the reduction zone.

In some embodiments, the separation member is an inverted or inclined hemispherical or conical ceramic heated membrane.

The separation member physically supports the downwardly advancing fuel during pyrolysis, to direct the advancement of the raw pyrolysis residue comprising char and ash towards the reduction zone, and heat the final stages of the pyrolysis zone.

The reduction zone is configured to form a bed of the pyrolysis residue having a uniform height/depth and radial width. The reduction zone is provided with a sloped perforated floor, one or more openings located centrally of the perforated floor, and a centrally located deflector. The deflector can be of any size and shape, such as square, rectangular, conical or cylindrical.

The floor in the reduction zone is sloped downward and inward toward the one or more openings, and configured by sizing of perforations therein, to allow primarily passage of the raw syngas therethrough and towards the outlet for the enhanced syngas, and to inhibit passage of the raw pyrolysis residue. The one or more openings are placed in fluidic communication with the outlet port to allow passage of the decarbonized pyrolysis residue therethrough.

The slope of the floor is greater than 0° to greater than the angle of material repose of the raw pyrolysis residue. In some embodiments, the slope of the perforated floor is from 30% less than to 30% more than the natural angle of repose of the pyrolysis residue. In some embodiments, floor slope approximates natural angle of repose of the pyrolysis residue.

In some embodiments, the slope of the perforated floor is between 0° to about 60°. In some embodiments, the angle of the perforated floor is about 30° to about 40°.

In some embodiments, the reduction zone is further provided with a first mechanism, configured to intermittently or continuously move pyrolysis residue from the perforated floor towards the one or more openings. In some embodiments, the mechanism comprises one or more pushing body configured to move along a path around the deflector, the pushing body located proximate to the perforated floor and outward from the one or more openings. In some embodiments the pushing body comprises one or more arms extending radially outwardly from the one or more openings. In some embodiments the radial arms have an angled face configured to contact and push a portion of the pyrolysis residue toward the one or more openings during motion of the pushing body. In some embodiments, the mechanism is configured to move a given distance along the path.

In some embodiments, the mechanism is associated with a controller configured to operate the mechanism depending on a pressure differential measured at a location before the pyrolysis residue bed and a location after the perforated floor.

In some embodiments, the reduction zone further comprises a second mechanism operable to push the decarbonized pyrolysis residue from the lower portion of a bed thereof toward the outlet ports.

In some embodiments, the first and second mechanisms are operable independently of each other. In some embodiments, the first and second mechanisms are integral.

In some embodiments of the invention, the system further comprises an outer shell having a shell inlet in communication with the syngas outlet, and a shell outlet, wherein the outer shell encircles/surrounds the pyrolysis zone, the partial oxidation zone and the reduction zone to form a channel for flow of the syngas toward the shell outlet. In some embodiments, the shell outlet is provided on an upper portion of the shell to allow the syngas to move upward in the channel to provide indirect thermal contact between the syngas and the pyrolysis zone.

In some embodiments of the system of the present invention, the pyrolysis zone, the partial oxidation zone and the reduction zone are comprised within separate containers/chambers.

Further details relating to the system and the process of the present invention are discussed with references to the figures.

System and Apparatus

Figure 2:
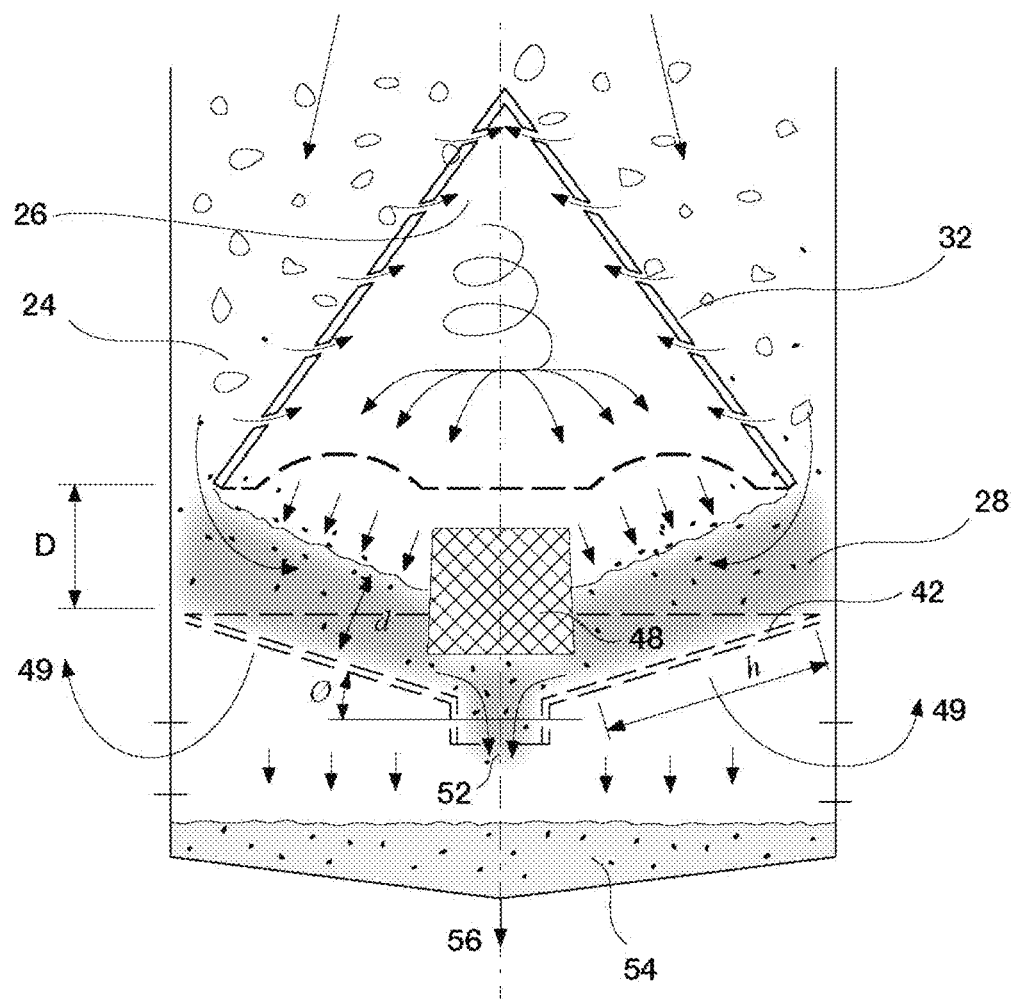
FIG. 2 is a schematic drawing depicting the oxidation and the reduction zones of a system in accordance with one embodiment of the present invention.
Figure 3:
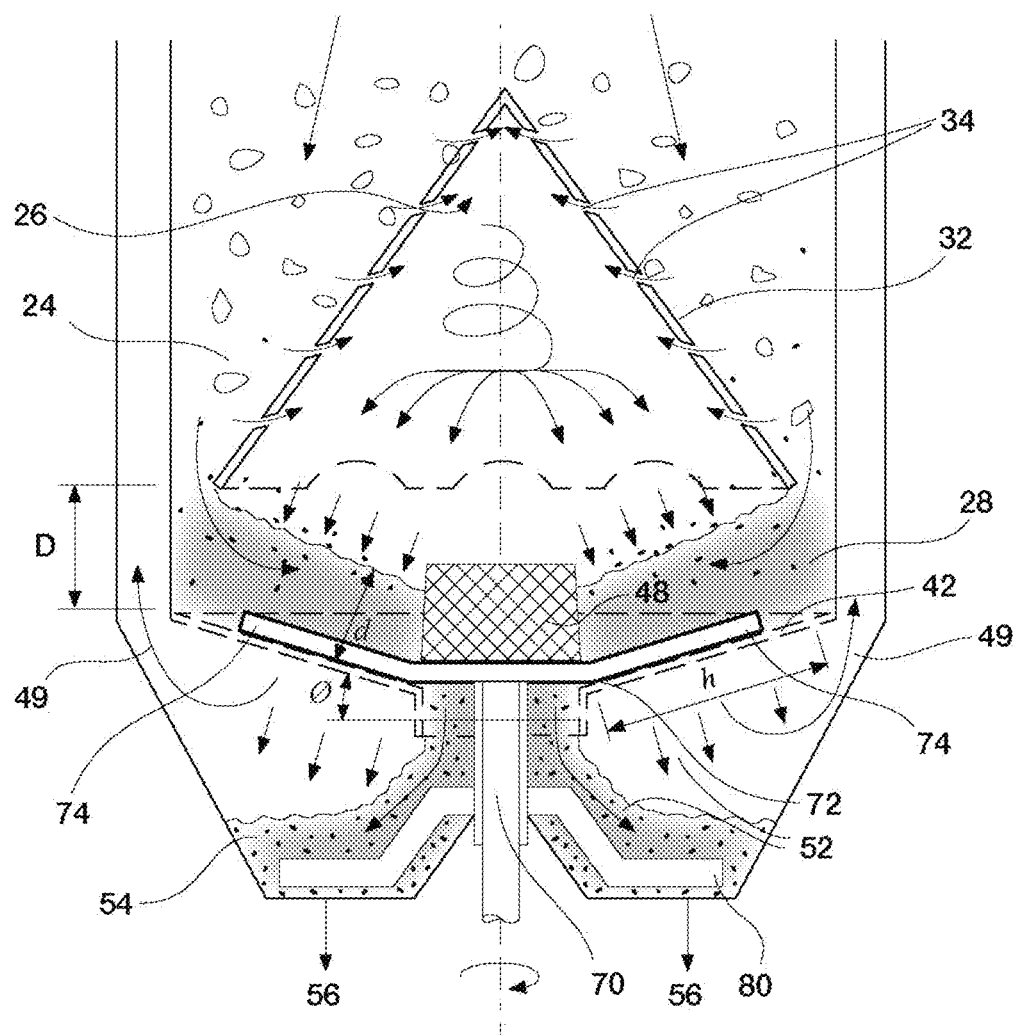
FIG. 3 is a schematic drawing depicting the oxidation and the reduction zones of a system in accordance with one embodiment of the present invention.

FIG. 1 illustrates simplified schematic diagram showing the general configuration of a system for a continuous multi-stage vertically sequenced gasification process for conversion of solid carbonaceous fuel material into clean (low tar) syngas. FIGS. 2 and 3 illustrate simplified diagram showing components of the system of the present invention.

Referring to FIG. 1, the system (1) comprises vertically sequenced pyrolysis zone (20), partial oxidation (PDX) zone (30) and reduction zone (40) within an elongated chamber (10). The Pyrolysis zone (20) and PDX zone (30) are separated by a separation member (32), such as an inverted or inclined hemispherical or conical ceramic heated membrane. The separation member further comprises upwardly angled vents (34) to provide a separation means for the pyrolysis vapours, whereby the pyrolysis vapours (26) are directed into the PDX zone, while rising upward in the PDX zone, and to inhibit passage of the pyrolysis residue (24) therethrough, while directing same to the reduction zone. The angle of the vents can be any angle between substantially horizontal to substantially vertical.

The reduction zone (40) comprises a sloped perforated floor/base (42), one or more one or more openings (46) located centrally relative to the perforated floor, and a centrally located deflector/diffuser (48). The floor is sloped downward and inward toward the one or more openings, and configured by sizing of perforations (44) therein, to allow primarily passage of the raw syngas therethrough towards the outlet (50) for the enhanced syngas (49) and to inhibit passage of the raw pyrolysis residue, and the one or more openings (46) are in fluidic communication with the outlet port (56), and configured to allow passage of the decarbonized pyrolysis residue (52) therethrough towards the outlet port (56).

As shown in FIG. 2, the perforated floor/base is spaced at a distance (D) from the separation member, such that the raw pyrolysis residue comprising raw ash/char (24) falling from the pyrolysis zone, is directed by gravity to effectively accumulate on the sloped perforated floor to form char bed (28) having a desired uniform depth (d), (wherein the value of "d" is equal to or less than "D") and a desired uniform radial width "h".

The slope of the floor ($\theta$) is greater than 0° to greater than the angle of material repose of the raw pyrolysis residue, or from 30% less than to 30% more than the natural angle of repose of the pyrolysis residue. In some embodiments, floor angle approximates the natural angle of repose of the pyrolysis residue.

In the embodiment depicted in FIG. 1, the chamber defining the pyrolysis zone, the PDX zone and the reduction zone are surrounded by a shell (60) having a shell inlet (62) at the lower portion, in fluidic communication with the enhanced syngas outlet (50) provided downstream of the pyrolysis residue bed (28), a shell outlet (64) in its upper portion, wherein the shell inlet (62) receives the enhanced syngas (49) from the syngas outlet (50), and the shell forms a channel for flow of the syngas upward toward the shell outlet (64).

FIG. 3 shows an example wherein the reduction zone of the system comprises a first mechanism (70) comprising a pushing body (72) comprising two or more arms (74) extending radially outwardly relative to the opening (46) to intermittently or continuously move pyrolysis residue from the perforated floor (42) towards the opening (46). The system also comprises a second mechanism (80) operable to push the decarbonized pyrolysis residue (52) from a lower bed (54) toward the outlet ports (56).

Gasification Process

Stage 1: Pyrolysis Reaction in Zone (20)

With reference to FIG. 1, carbonaceous fuel material/biofuel (12/16) is fed at the top portion (18) of the pyrolysis zone at approximately 50° C. to 100° C. and the pyrolysis process is started by gradually heating pyrolysis zone to more than 100° C., preferably greater than 200° C., more preferably greater than 400° C., where pyrolysis vapours (26) (primarily methane ($CH_4$), hydrogen and tar) and raw pyrolysis residue (24) comprising ash and char are formed while, advancing vertically by gravity downward. The first oxidant (22), which may be pure or mixed oxidant, is optionally added to the lower to mid portion of the pyrolysis zone (20) to control the temperature of the zone and advance the pyrolysis biomass reduction process. The pyrolysis reaction is shown in scheme below.

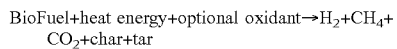
BioFuel+heat energy+optional oxidant→$H_2$+$CH_4$+$CO_2$+char+tar

The pyrolysis vapours generally contain relatively high portion of volatile tars derived from the pyrolysis process, which normally causes significant plugging and fowling problems if condensed and cooled in downstream systems, resulting in very low gasifier reliability and on-stream performance.

As the carbonaceous fuel material/biofuel advances vertically towards the lower portion of the vertical pyrolysis zone (20), the fuel will reduce by more than 70% weight to char or commonly known as "wood coal" with significantly lower density than the feed biofuel. The vertical configuration with increasing perimeter, disclosed in the present application allows gravity to drive the biofuel consistently and uniformly advance vertically through the pyrolysis stage. This inherently provides for stable and consistent production of syngas.

The pyrolysis residue (24) is advanced by gravity downward and distributed to the outer region of the heated membrane, and fall through horizontal gaps in the outer periphery of the membrane, vertically down to form a pyrolysis residue bed (28) in the endothermic reduction zone. The ceramic membrane is typically suitable for continuous maximum operating temperature of greater than 2000° C. (3600° F.).

A suitable rotating mechanical spreader (not shown) can be placed at the surface (18) of the pyrolysis zone (20) to evenly spread the biomass feed (16) into the top of the pyrolysis zone. The equal or even height of the biomass allows the reducing biomass to flow consistently and stably through pyrolysis stage and produce a very desirable stable flow of syngas.

Stage 2: Partial Oxidation (PDX) in Zone (30)

A second oxidant (36), pure or mixed, is added below the heated membrane (32) in the PDX zone (30), to create a partial oxidization temperature of greater than 900° C., more preferred greater than 1000° C., up to 1250° C. for non-slagging, and greater than 1250° C. or an ash fusion temperature for slagging. Pyrolysis vapours (26) pass through upwardly angled vents (34) from pyrolysis zone and are partially oxidized with the second pure oxidant to reform the pyrolysis vapours to raw syngas (38) consisting primarily of CO, $CO_2$ and $H_2$, with lower concentrations of $CH_4$, and inerts such as $N_2$, and Ar, and significantly reduced concentrations of tar. The composition of inerts in the raw syngas (38) is dependent primarily on composition and quality of oxidant.

The pure or mixed oxidant can be air (containing nitrogen), enriched air (containing lower portion of nitrogen), $O_2$ of relatively high purity (>85 wt % $O_2$, preferably greater than 95 wt % and more preferrably greater than 98 wt % to avoid inefficient inert purging), air or $O_2$ mixed with $CO_2$ and or steam ($H_2O$). The $CO_2$ and $H_2O$ can be premixed with second oxidant and used in PDX zone to control temperature if $O_2$ or enriched air is used. External methane $CH_4$ can also be mixed into oxidant to add heat energy to control PDX zone temperature if needed.

Stage 3: Endothermic Reduction in Zone (40)

With the uniform pyrolysis residue bed (28) having uniform depth (d) and width (h), the raw syngas flow space velocity is consistent and pressure drop is low and consistent, to maximize the benefits and effect of the endothermic reaction in the reduction zone. Raw syngas vapours (38) rich in $CO_2$ and/or steam ($H_2O$) and containing a reduced concentration of tars passes in contact with the uniform hot bed (28) of carbon rich ash/char whereby following reactions occur to form enhanced syngas gas (49):

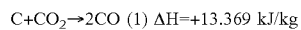
C+$CO_2$→2CO (1)  ΔH=+13.369 kJ/kg

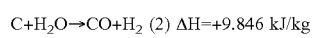
C+$H_2O$→CO+$H_2$ (2)  ΔH=+9.846 kJ/kg

The high temperatures of the PDX raw syngas carries sufficient physical enthalpy, $CO_2$ and/or $H_2O$ to drive the endothermic carbonization reactions. Higher feed concentrations and varied amounts of $CO_2$ and steam ($H_2O$) can be added to the second oxidant in stage 2 to optimize the reactions (1) and (2) in stage 3 and maximize carbon conversion from the char. Feed levels of $CO_2$ and $H_2O$ greater than the stoichiometric levels, can also be added to the oxidant to cool the temperature of the PDX zone to below 1250° C., if the oxidant used is concentrated $O_2$, with low or no levels of $N_2$.

The raw syngas (38), containing reduced level of tars at a temperature greater than 900° C., is directed vertically downward through the evenly distributed char bed (28) in the reduction zone. This results in the following very desirable benefits;

Raw syngas is cooled by endothermic reactions (1) and (2) to a temperature less than the temperature of the PDX zone. In some embodiments, the temperature of enhanced syngas leaving the reduction zone is about 600° C. or less.

2. Raw syngas is scrubbed substantially clear of all remaining tars to form tar free enhanced syngas, eliminating all concerns of plugging or fowling of downstream equipment.
3. Higher quantity enhanced syngas is produced, improving the overall carbon conversion efficiency and cold gas efficiency of the process,
4. The clean enhanced syngas having greater calorific value is formed.
5. Raw ash or char is significantly reduced in carbon content forming decarbonized residue, and allowing same to be used safely as fertilizer or safe disposal.
6. Carbon content of ash can further be regulated by reducing residence time in stage 3, to intentionally produce an ash with carbon, well known as carbon ash used for the commercial production of briquettes, or bio-char fertilizer.

As shown in FIG. 1, clean enhanced syngas (49), at about 600° C. and substantially free of all tars and solid particulates passes concentrically from the reduction/endothermic stage and rises vertically into channel formed by the shell (60), wherein heat energy from the syngas is indirectly counter-currently transferred in reverse vertical sequence to the pyrolysis stage, thereby further cooling the raw syngas and providing heat energy to the pyrolysis stage. The enhanced syngas exits the gasifier below 600° C., more preferred between 500° C. to 600° C. Any form of enhanced heat transfer configuration or means, know to those skilled in art, may be used to effect the maximum heat transfer process. Cooled enhanced syngas (66) is collected the top of the gasifier and is transferred for further cleaning and processing. The clean syngas, substantially free of all tars, can be used in engines to generate electric power and/or chemical production such as DME, Methanol, or Fischer Tropsch products such as syndiesel.

The inventors of the present invention have surprisingly found that the configuration of the separation member to direct the raw pyrolysis residue/char into the reduction zone, along with the presence of sloped perforated floor, one or more openings located inwardly/centrally relative to the perforated floor, and a centrally located deflector in the reduction zone, as described in the present application, results in the formation of a reduction bed of pyrolysis residue having a substantially uniform depth (d), and width (h), as depicted in FIG. 2.

The uniform bed provides the critical uniform pressure drop and flow distribution of the raw syngas from the pyrolysis zone over the entire residue or char bed which facilitates consistent flow and consistent quality of raw syngas and clean ash.

The uniform pyrolysis residue bed promotes an efficient endothermic reaction between $CO_2$ and $H_2O$ in the syngas and carbon content in the pyrolysis residue, and by controlling the reduction zone residence time and syngas flow space velocity during the endothermic reaction with reduced risk of channeling, results in the formation of substantially tar free raw syngas, reduction of carbon content in the pyrolysis residue, and reduction in the temperature of raw syngas as compared to the temperature of the partial oxidation zone.

In some embodiments, the substantially tar free syngas comprises less than 200 ppm of tar. In some embodiments tar is less than 100 ppm, further in some embodiments, tar is less than 50 ppm. In some embodiments, substantially tar free syngas comprises less than 10 ppm of tar.

In the embodiment, when the Stage 2 temperature is operated above ash fusion temperature, typically above 1200° C., then a liquid slag is formed, which can be separated, quenched and converted to vitrified solid which is non-leachable and safe to dispose in normal means. The ash, in whatever form, is removed from the gasifier and cooled for storage and disposal.

Figure 4:
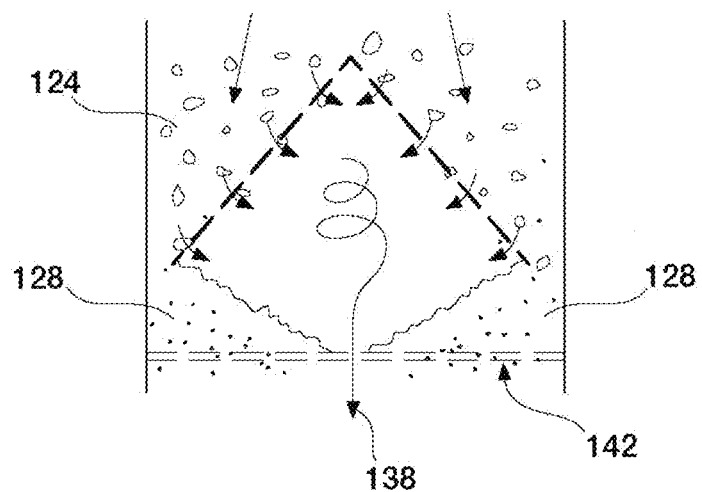
FIG. 4 is a schematic drawing depicting the oxidation and reduction zones of a prior art gasifier and the process.

As depicted in FIG. 4, in early prior art gasifiers having no deflector in the center of the reduction zone floor (142) resulted in the formation of uneven char bed (128). Due to very high angle of repose of the falling pyrolysis residue/char (124), the height difference between the central portion of the reduction bed and the peripheral portions is so large that the raw syngas simply channels through the path of lowest pressure drop and eliminates any reduction effect. As seen in FIG. 4, for a critical amount of raw syngas (138) passing through the central area of the reduction bed, which represents most or all of the gas, the pressure loss of gas is significantly lower than the edge area, and the gas passing through this area would not be able to undergo the endothermic reaction to achieve the desired results of forming enhanced syngas and decarbonized pyrolysis reside.

Figure 5:
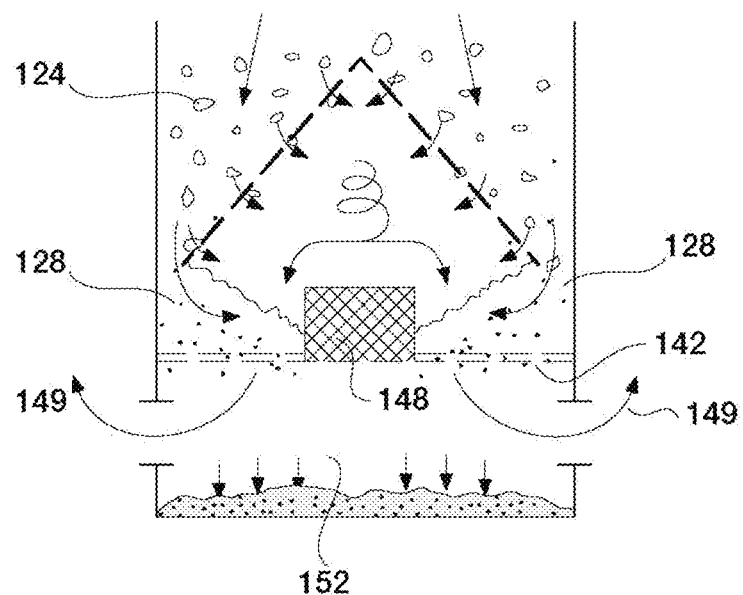
FIG. 5 is a schematic drawing depicting the oxidation and reduction zones of another prior art gasifier and the process.

FIG. 5 depicts another prior art gasifier, which incorporates a homogenizing cylinder (148) in the center of the reduction zone floor. However, this arrangement also fails to provide a char bed of uniform depth and promotes channeling of the syngas with undesirable results. As seen in this figure, the raw pyrolysis residue (124) falls with substantial angle of repose to form an uneven bed (128), which also results in un-effective reduction reaction leading to poor quality syngas (149) and pyrolysis residue (152).

Typical feed streams (12) may include chipped, pelletized, shredded or mechanically processed wood, construction wood waste, coal, petcoke, forestry waste wood with or without green and bark material, solid sewage sludge, selected municipal solid waste (MSVV), controlled refuse-derived fuel (RDF) containing specific compositions of plastic and biomass, agricultural waste, or any blended or combinations of above materials. The Heating Value of these materials range from 3000 to 6000 BTU/lb for MSW, to 7000 BTU/lb for RDF, to 7000 BTU/lb for wood chips, to 10000 BTU/lb for coal, to 13000 BTU/lb for petcoke. In a further embodiment, the biomass fuel can be sprayed, coated with or impregnated with liquid or solid carbonaceous materials to enhance the gasifier process. All biomass feed materials (12) may contain moisture levels of 0 to 50 wt % whereby waste heat from gasifier is used to dry materials to 5 to 15 wt %, preferred to 10 to 12 wt % before being fed to gasifier. Integrated drying means (14) using excess low level heat energy from the Biomass Gasifier process increases the overall thermal efficiency of the unit. Moisture content of biomass may vary from summer to winter seasons. The biomass material is typically sized from +1 mm to −100 mm, well known to those skilled in the art to facilitate favorable material handling and flowing properties.

The physical size or shape of each gasifier process stage and zone can vary and be adjusted by those skilled in the art and may or may not be physically the same for each stage. The key is that the stages and zones are configured in the correct sequence, or more preferred, correct vertical sequence to achieve the desired results as disclosed.

The biomass gasification process may be performed in separate vessels or groupings of vessels or more preferred, in a single vessel as long as the process sequence and vertical flow sequence is performed as disclosed to create the novel desired process performance.

The process may be operated at any pressure to accommodate the economic integration with the downstream processes or the biomass gasification process must be suitably equipped with syngas compression means. By way of example the process can be operated at slightly vacuum conditions to near atmospheric pressure for electric power generation applications, where a clean syngas booster blower fan is used to create 1 to 10 psig pressure to feed to the syngas engines driving electric generators. In another example, the biomass gasifier process may operate at 10 to 100 psig, feeding syngas to a suitable gas compressor, well known by those skilled in the art, to boost the pressure to 300 to 500 psig to process in a Fischer-Tropsch unit for production of synthetic products, such as syndiesel.

Other features, such as various syngas cleanup unit operations, including unit operations such as a high efficiency, high temperature particulate separator or ceramic filter are added to remove fine particles from the raw syngas. These features may be integrated directly into the gasifier unit or be installed directly downstream of the gasifier to effect the process.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

The embodiments of the invention for which an exclusive property or privilege is claimed are defined as follows:

1. A continuous multi-stage vertically sequenced gasification process for conversion of a solid carbonaceous fuel material into a low tar syngas in a gasifier comprising:
   i) a pyrolysis zone,
   ii) a partial oxidation zone located vertically downstream of the pyrolysis zone, and separated from the pyrolysis zone via a separation member comprising a plurality of upwardly angled vents;
   iii) a reduction zone located vertically downstream of the partial oxidation zone and comprising an angled perforated floor, an openings located centrally relative to the angled perforated floor, and a centrally located deflector; the angled perforated floor being sloped downwardly and inwardly toward the opening, wherein the perforated floor is configured, by sizing of perforations therein, to allow passage of a raw syngas therethrough, and to inhibit passage of a raw pyrolysis residue obtainable in the pyrolysis zone, wherein the slope of the angled perforated floor is greater than zero degrees and less than 60 degrees;
   said process comprising the steps of:
   a) feeding the solid carbonaceous fuel material through the upper portion of the pyrolysis zone vertically downwardly towards the lower portion of the pyrolysis zone, while pyrolyzing the solid carbonaceous fuel material into pyrolysis vapours comprising a hydrocarbon material, and the raw pyrolysis residue comprising char and ash;
   b) optionally adding a first oxidant to the lower portion of the pyrolysis zone to achieve a temperature greater than 200° C.;
   c) directing the pyrolysis vapours to the partial oxidation zone, and directing the raw pyrolysis residue downwardly to the reduction zone via the separation member;
   d) adding a second oxidant in the partial oxidation zone to achieve a temperature sufficient to reform the pyrolysis vapours into the raw syngas containing significantly reduced levels of tar;
   e) forming a pyrolysis residue bed having a uniform depth from the raw pyrolysis residue formed in step c) on the floor of the reduction zone;
   f) passing the raw syngas from step d) downwardly through the pyrolysis residue bed formed in step e), and carrying out an endothermic reaction between $CO_2$ and/or $H_2O$ in the raw syngas and carbon of the char in the pyrolysis residue bed, while controlling a reduction zone pressure drop, a reduction zone residence time and a reduction zone flow space velocity of the raw syngas during the endothermic reaction to form a substantially tar free enhanced syngas and a decarbonized pyrolysis residue;
   g) passing the substantially tar free enhanced syngas from step f), in upward counter-current flow, to heat the pyrolysis zone and subsequently cool the substantially tar free syngas;
   h) collecting the substantially tar free syngas; and
   i) collecting the decarbonized pyrolysis residue from the bottom of the gasifier.

2. The process of claim 1, wherein the process is carried out under a pressure, the pressure being less than 600 psig.

3. The process of claim 1, wherein the solid carbonaceous fuel material comprises a biomass fuel selected from wood chips, railway tie chips, waste wood, forestry waste, sewage sludge, pet coke, coal, Municipal Solid Waste (MSW), Refuse-derived Fuel (RDF), or any combination thereof.

4. The process of claim 3, wherein the biomass fuel is formed by a chipping, shredding, extrusion, mechanical processing, compacting, pelletizing, granulating, or crushing process.

5. The process of claim 3, where the biomass fuel has been sprayed with, coated with or impregnated with liquid or solid carbonaceous materials.

6. The process of claim 1, wherein the partial oxidation zone has a temperature sufficient to create a liquid slag, wherein the temperature is greater than 1250° C., or greater than an ash fusion temperature of the raw pyrolysis residue.

7. The process of claim 1, wherein the first oxidant and the second oxidant independently comprises air, enriched air, oxygen with purity greater than 85 wt %, or oxygen with purity greater than 95 wt %.

8. The process of claim 7, wherein the first oxidant and the second oxidant are same.

9. The process of claim 7, wherein the first oxidant and the second oxidant are different.

10. The process of claim 7, wherein the first oxidant and/or the second oxidant further comprises $H_2O$ and/or $CO_2$.

11. The process of claim 10, wherein the first oxidant comprises air, enriched air, oxygen with purity greater than 85 wt %, or oxygen with purity greater than 95 wt %, and the second oxidant comprises a mixture of at least one of air, enriched air, oxygen with purity greater than 85 wt %, and oxygen with purity greater than 95 wt %, with $H_2O$ and/or $CO_2$.

12. The process of claim 1, further comprising agitating and/or rotating the pyrolysis residue bed comprising the raw pyrolysis residue and/or the decarbonized pyrolysis residue.

13. An apparatus for a continuous multi-stage vertically sequenced gasification process for conversion of a solid carbonaceous fuel material into a low tar syngas, the apparatus comprising:
   i) a pyrolysis zone for converting the solid carbonaceous fuel material into pyrolysis vapours comprising a hydrocarbon material, and a carbon rich raw pyrolysis residue comprising char and ash;

ii) a partial oxidation zone located vertically downstream of the pyrolysis zone for conversion of the hydrocarbon material in the pyrolysis vapours into a raw syngas comprising $H_2$, CO and $CO_2$;
iii) an endothermic reduction zone located vertically downstream of the partial oxidation zone for converting the raw syngas into a substantially tar free syngas and for reducing the carbon content of the carbon rich raw pyrolysis residue to obtain a decarbonized pyrolysis residue;
iv) a separation member located between the pyrolysis zone and the partial oxidation zone, the separation member comprising a plurality of upwardly angled vents to allow the pyrolysis vapours into the partial oxidation zone and to inhibit passage of the carbon rich raw pyrolysis residue therethrough, the separation member being configured to direct the carbon rich raw pyrolysis residue into the reduction zone;
v) an outlet port for the decarbonized pyrolysis residue, located downstream of the reduction zone; and
vi) an outlet for the substantially tar free syngas located downstream of the reduction zone;
wherein the reduction zone comprises an angled perforated floor, an openings located centrally relative to the angled perforated floor, and a centrally located deflector,
the angled perforated floor being sloped downwardly and inwardly toward the opening, and configured, by sizing of perforations therein, to allow passage of the raw syngas therethrough and to inhibit passage of the carbon rich raw pyrolysis residue, the opening being in fluidic communication with the outlet port, and configured to allow passage of the decarbonized pyrolysis residue therethrough, wherein the slope of the angled perforated floor is greater than zero degrees and less than 60 degrees.

14. The apparatus of claim 13, further comprising a first mechanism in communication with the reduction zone, configured to intermittently or continuously move the carbon rich raw pyrolysis residue and/or the decarbonized pyrolysis residue from the angled perforated floor towards the opening.

15. The apparatus of claim 14, wherein the first mechanism comprises a pushing body configured to move along a path around the deflector, the pushing body located proximate to the angled perforated floor and outward from the opening.

16. The apparatus of claim 15, wherein the pushing body comprises one or more arms extending radially outwardly relative to the opening.

17. The apparatus of claim 16, wherein the arms have angled faces configured to contact and push a portion of the carbon rich raw pyrolysis residue and/or the decarbonized pyrolysis residue toward the opening during motion of the pushing body.

18. The apparatus of claim 15, further comprising a controller configured to operate the first mechanism depending on a pressure differential measured at a location above a pyrolysis residue bed comprising the raw pyrolysis residue and/or the decarbonized pyrolysis residue and a location below the angled perforated floor.

19. The apparatus of claim 14, further comprising a second mechanism operable to push the decarbonized pyrolysis residue toward the outlet port.

20. The apparatus of claim 19, wherein the first and second mechanisms are operable independently of each other.

21. The apparatus of claim 13, wherein the pyrolysis zone, the partial oxidation zone and the reduction zone are located within one container/chamber.

22. The apparatus of claim 13, further comprising an outer shell having a shell inlet in communication with the syngas outlet, and a shell outlet, wherein the outer shell surrounds the pyrolysis zone, the partial oxidation zone and the reduction zone to form a channel for flow of the substantially tar free syngas toward the shell outlet.

23. The apparatus of claim 22, wherein the shell outlet of the outer shell is provided on an upper portion of the outer shell to allow the substantially tar free syngas to move upward in the channel to provide indirect thermal contact between the substantially tar free syngas and the pyrolysis zone.

24. The apparatus of claim 13, wherein the pyrolysis zone, the partial oxidation zone and the reduction zone are located in separate containers/chambers.

25. The apparatus of claim 13, wherein the perimeter of a lower portion of the pyrolysis zone is greater than the perimeter of an upper portion.

26. The apparatus of claim 13, wherein the angled perforated floor of the reduction zone is configured to be agitated.

* * * * *